(12) United States Patent
Schutte et al.

(10) Patent No.: US 9,494,268 B2
(45) Date of Patent: Nov. 15, 2016

(54) SUPPLY STOP WITH CONNECTION VERIFICATION

(75) Inventors: Joseph P. Schutte, Westland, MI (US); William Franklin Turnau, III, Canton, MI (US); Brian D. Sanzone, Commerce Township, MI (US); Derry Yourman, Canton, MI (US)

(73) Assignee: Brasscraft Manufacturing Company, Novi, MI (US)

( * ) Notice: Subject to any disclaimer, the term of this patent is extended or adjusted under 35 U.S.C. 154(b) by 1306 days.

(21) Appl. No.: 12/603,161

(22) Filed: Oct. 21, 2009

(65) Prior Publication Data

US 2011/0089681 A1 Apr. 21, 2011

(51) Int. Cl.
*F16L 37/084* (2006.01)

(52) U.S. Cl.
CPC .......... *F16L 37/084* (2013.01); *F16L 37/0915* (2016.05); *F16L 2201/10* (2013.01)

(58) Field of Classification Search
CPC ... F16L 29/02; F16L 37/084; F16L 37/0915; F16L 2201/10
USPC ........ 285/305, 308, 310, 319, 921, 313–315
See application file for complete search history.

(56) References Cited

U.S. PATENT DOCUMENTS

| | | | |
|---|---|---|---|
| 1,440,207 A | 12/1922 | Burns | |
| 2,479,960 A | 8/1949 | Osborn | |
| 3,131,905 A | 5/1964 | Nyberg | |
| 3,334,661 A | 8/1967 | Milette | |
| 3,429,596 A * | 2/1969 | Marshall | 285/340 |
| 3,776,260 A | 12/1973 | Ruddick | |
| 4,049,014 A | 9/1977 | Johnson et al. | |
| 4,336,824 A | 6/1982 | Steineman | |
| 4,613,112 A * | 9/1986 | Phlipot et al. | 251/149.6 |
| 4,632,437 A | 12/1986 | Robson | |
| 4,717,048 A | 1/1988 | Stenger | |
| 4,749,214 A | 6/1988 | Hoskins et al. | |
| 4,964,657 A * | 10/1990 | Gonzales | 285/8 |
| 5,090,599 A | 2/1992 | Stenger | |
| 5,405,175 A * | 4/1995 | Bonnah et al. | 285/305 |
| 5,803,513 A | 9/1998 | Richardson | |
| 5,971,019 A | 10/1999 | Imai | |
| RE36,630 E | 3/2000 | Davey | |
| 6,173,999 B1 | 1/2001 | Guest | |

(Continued)

FOREIGN PATENT DOCUMENTS

| | | |
|---|---|---|
| EP | 0528079 A1 | 2/1993 |
| EP | 0745801 A1 | 12/1996 |

(Continued)

OTHER PUBLICATIONS

Search Report and Written Opinion mailed on Jan. 14, 2011 for PCT/US2010/052999.

(Continued)

*Primary Examiner* — David E Sosnowski
*Assistant Examiner* — James Linford
(74) *Attorney, Agent, or Firm* — Carlson, Gaskey & Olds, PC

(57) ABSTRACT

An apparatus for connecting a conduit has a body attaching to the conduit, a seal having a shape extending around and minimizing leakage from the conduit, and a activator for enabling the seal so that the seal minimizes leakage from the conduit if the conduit is properly inserted in the body.

21 Claims, 3 Drawing Sheets

(56) References Cited

U.S. PATENT DOCUMENTS

| | | |
|---|---|---|
| 6,293,596 B1 | 9/2001 | Kinder |
| 6,328,344 B1 | 12/2001 | Tozaki et al. |
| 6,450,550 B1 | 9/2002 | Cornwell |
| 6,637,779 B2 | 10/2003 | Andre |
| 6,702,335 B2 | 3/2004 | Bahner et al. |
| 6,860,523 B2 | 3/2005 | O'Neill et al. |
| 6,893,051 B1 | 5/2005 | Park et al. |
| 6,905,143 B2 | 6/2005 | Klinger et al. |
| 7,014,220 B2 | 3/2006 | Szabo et al. |
| 7,029,036 B2 | 4/2006 | Andre |
| 7,121,592 B2 | 10/2006 | Sazbo et al. |
| 7,128,347 B2 | 10/2006 | Kerin |
| 7,232,159 B2 | 6/2007 | O'Neill et al. |
| 7,300,076 B2 | 11/2007 | Inoue |
| 7,314,209 B2 | 1/2008 | Pierson |
| 7,338,030 B2 | 3/2008 | Brown, III |
| 7,390,025 B2 | 6/2008 | Pepe et al. |
| 7,396,053 B2 | 7/2008 | Webb et al. |
| 7,419,190 B1 | 9/2008 | Atkinson et al. |
| 7,434,846 B2 | 10/2008 | Baumgartner |
| 7,445,249 B2 | 11/2008 | Feger et al. |
| 7,455,330 B2 | 11/2008 | Baumgartner |
| 7,464,970 B2 | 12/2008 | Yamada et al. |
| 7,469,880 B2 | 12/2008 | Green et al. |
| 7,469,936 B2 | 12/2008 | Norman |
| 7,497,480 B2 | 3/2009 | Kerin et al. |
| 7,523,966 B2 | 4/2009 | O'Neill et al. |
| 7,527,303 B2 | 5/2009 | Furuya |
| 7,530,605 B2 | 5/2009 | Rigollet et al. |
| 7,644,958 B2 | 1/2010 | Postler |
| 7,651,138 B2 | 1/2010 | Feger et al. |
| 7,686,349 B2 | 3/2010 | Guest |
| 7,726,700 B2 | 6/2010 | Norman |
| 7,810,850 B2 | 10/2010 | O'Neill et al. |
| 7,823,930 B2 | 11/2010 | Feger et al. |
| 7,841,630 B1 | 11/2010 | Auray et al. |
| 2003/0217571 A1 | 11/2003 | Turnau et al. |
| 2004/0021120 A1 | 2/2004 | Turnau, III et al. |
| 2006/0208213 A1 | 9/2006 | Turnau et al. |
| 2007/0075542 A1 | 4/2007 | Glaze et al. |
| 2007/0241562 A1 | 10/2007 | O'Neill et al. |
| 2008/0061550 A1 | 3/2008 | Brosius et al. |
| 2008/0238088 A1 | 10/2008 | Webb |
| 2008/0238096 A1 | 10/2008 | Kees et al. |
| 2009/0001712 A1 | 1/2009 | Webb et al. |
| 2009/0194990 A1 | 8/2009 | Williams |

FOREIGN PATENT DOCUMENTS

| | | |
|---|---|---|
| JP | WO2005/106311 A1 | 11/2005 |
| WO | WO 03/089827 | 10/2003 |

OTHER PUBLICATIONS

Search Report and Written Opinion mailed on Jan. 24, 2011 for PCT/US2010/053004.

Search Report and Written Opinion mailed on Feb. 8, 2011 for PCT/US2010/053029.

Written Opinion of the International Preliminary Examining Authority, mailed on Nov. 24, 2011 for PCT/US2010/052999.

* cited by examiner

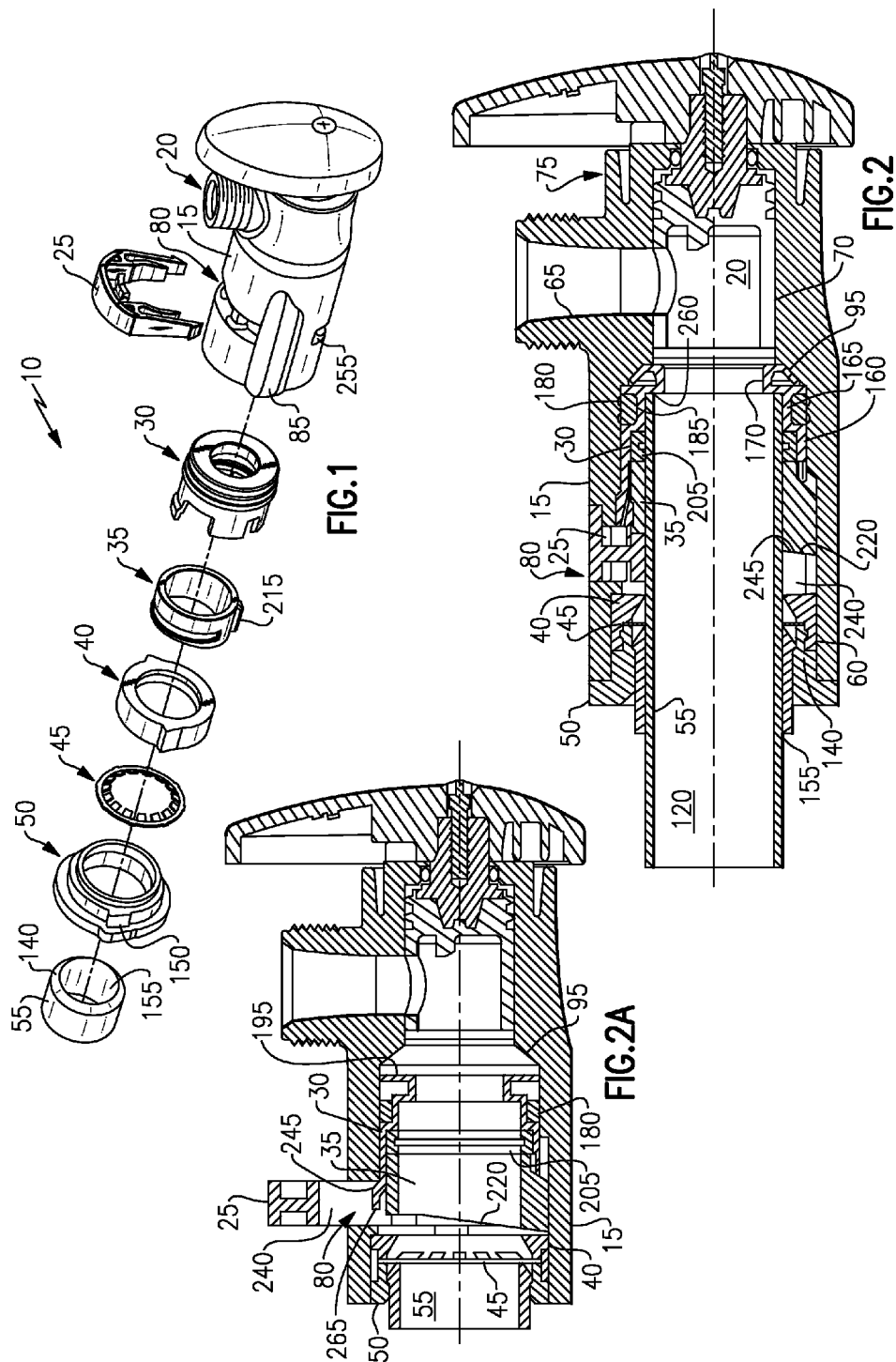

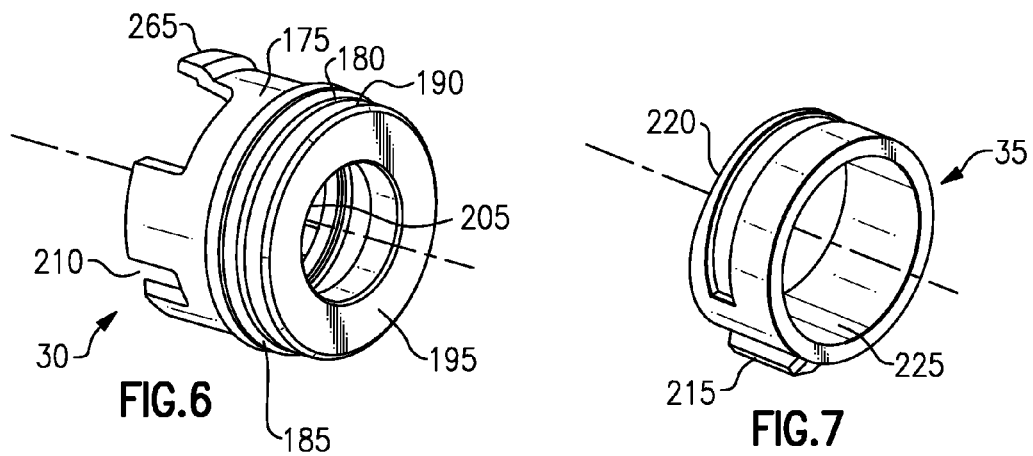
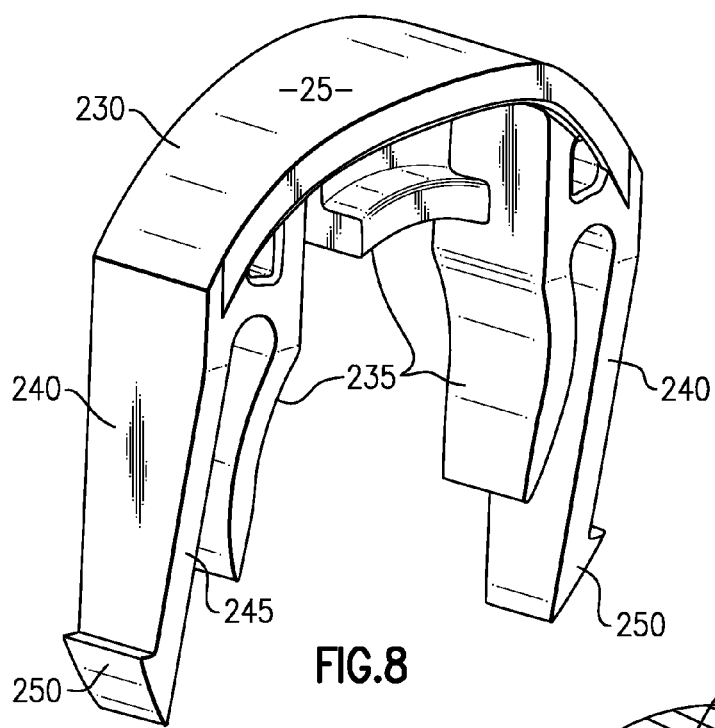
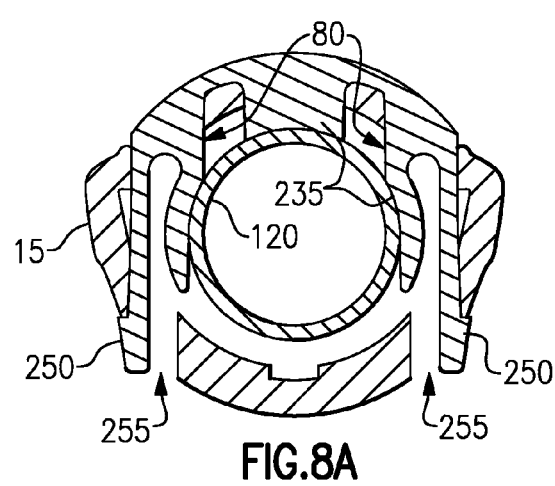

SUPPLY STOP WITH CONNECTION VERIFICATION

REFERENCE TO RELATED APPLICATION

Cross reference is made to copending U.S. patent application Ser. No. 12/603,142 entitled "ANTI-ROTATION GRIPPER RING"; and Ser. No. 12/603,121 entitled "BIAS RELEASE CARTRIDGE".

BACKGROUND

Snap-fit or quick connectors are employed in a wide range of applications including automotive and industrial applications, among others. Such quick connectors utilize retainers or locking elements for securing one connector component, such as a tubular conduit, within a complimentary bore of another connector component or body. These retainers are typically of the axially-displaceable or radially-displaceable type. The terms "axially-displaceable" or "radially-displaceable" are taken relative to the axial bore through a female component.

In a typical quick connector with an axially displaceable retainer, the retainer is mounted within a bore in a body of one connector component. The retainer has a plurality of radially and angularly extending legs that extend inwardly toward the axial center line of the bore in the body. A tube to be sealingly mounted in the bore in one component includes an outwardly extending portion or a flange that abuts an inner peripheral surface of the retainer legs. Seal and spacer members as well as a bearing or top hat are typically mounted in the bore ahead of the retainer to form a seal between the body and the component if the component is lockingly engaged with the retainer legs in the body.

Radially displaceable retainers are also known in which the retainer is radially displaceable through aligned bores or apertures formed transversely to the main through bore in the body. The radially displaceable retainer is typically provided with a pair of depending legs that are sized and positioned to slip behind the outwardly extending portion or flange on the tube only when the tube is fully seated in the bore in the body. This ensures a positive locking engagement of the tube with the body as well as providing an indication that the tube is fully seated since the radially displaceable retainer can be fully inserted into the body only when the tube has been fully inserted into the bore in the body.

Other quick connectors utilize retainers designed to lockingly engage beadless endforms. One type of such retainers forms an annular clip with a plurality of radially inward extending, flexible fingers, that engage the endform at an angle to resist pullout of the endform from the connector body. Another type has a radially inward projection which engages a recess in the endform.

SUMMARY OF THE INVENTION

According to a non-limiting embodiment, an apparatus for connecting a conduit has a body attaching to the conduit, a seal having a shape extending around and minimizing leakage from the conduit, and an activator for activating the seal so that the seal minimizes leakage from the conduit if the conduit is properly inserted in the body.

According to another non-limiting embodiment, an apparatus for securely fastening a pipe to a body includes a seal disposed in the body and extending around and minimizing leakage from the pipe, and an activator for activating the seal so that the seal minimizes leakage from the pipe if the pipe is properly inserted in the body.

According to another non-limiting embodiment, an apparatus for verifying installation of a conduit in a housing includes a seal for sealing the conduit within the housing, the seal not sealing the housing if the conduit is not installed properly, a compressor for urging the seal against the conduit while installing the conduit, and a clip for urging the compressor against the seal and for creating a signal if the conduit is properly installed.

BRIEF DESCRIPTION OF THE DRAWINGS

FIG. 1 is a perspective, disassembled view of an embodiment of a supply stop.

FIG. 2 is an assembled, cutaway view of the supply stop of FIG. 1 in an installed position.

FIG. 2A is a, cutaway view of the supply stop of FIG. 2 in an un-installed position.

FIG. 6 is a perspective view of a verification cartridge of FIG. 1.

FIG. 7 is a perspective view of a compression ring of FIG. 1.

FIG. 8 is a perspective view of a verification clip of FIG. 1.

FIG. 8A is an end schematic view of an assembled verification clip seated in a body of FIG. 1.

DESCRIPTION

Figure 3:
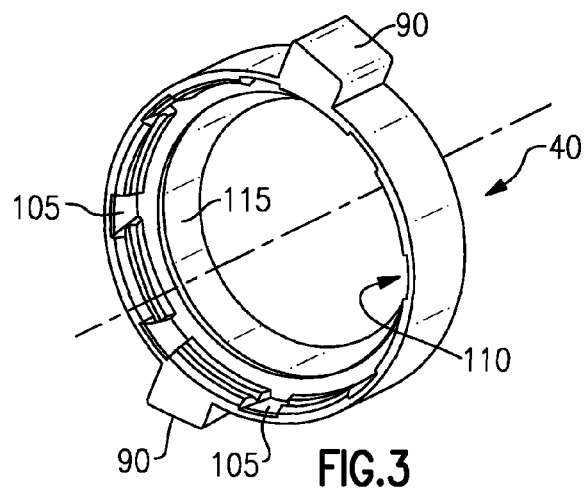
FIG. 3 is a perspective view of a retainer of FIG. 1.

Referring to FIGS. 1 and 2, a non-limiting embodiment of a supply stop 10 is shown. The embodiment has a body 15, a valve portion 20, a verification clip (activator) 25, a verification cartridge 30, a compression ring 35, a backer ring 40, a gripper ring 45, a retainer 50 and a collet 55.

A body 15 has as a main inlet bore 60, an outlet bore 65, a minor bore 70 in which the valve portion 20 is disposed, and a handle assembly 75. The body further has a semi-circular opening 80 (see also FIG. 8A) in which the verification clip 25 may be inserted as will be discussed herein. The body 15 also has a pair of outboard openings 85 (see also FIG. 5) extending from the main bore 60 into which ears 90 extending from the backer ring 40 are inserted (see also FIG. 5) as will be discussed herein below.

The body 15 has a chamfered surface 95 that extends from the main bore 60 to the minor bore 70 to form an interference fit with the verification cartridge 30 as will also be discussed herein below.

Referring to FIGS. 2-5, the collet 55, the retainer 50 and gripper ring 45, the backer ring 40 form an assembly 100 in the body 15.

In FIG. 3, the backer ring 40 is shown having a plurality of indentations 105 and an inner wall 110, and a flange 115 backing the indentations depending inwardly therefrom. The flange 115 has approximately the same inner diameter as a pipe 120 (see FIGS. 2 and 5) that might be passed therethrough to provide fluid through the inlet bore 60 to the valve portion 20. An outer surface 125 of the backer ring 40 has a pair of ears 90 that fit into a pair of outboard openings 85 (see also FIG. 5) in the body 15.

Figure 4:
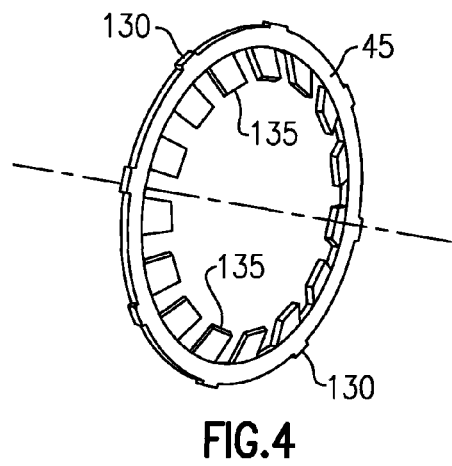
FIG. 4 is a perspective view of a gripper ring of FIG. 1.

As shown in FIG. 4, the gripper ring 45 has a plurality of outwardly depending fingers 130 that mate with the indentations 105 in the backer ring 40. The gripper ring 45 also has a plurality of teeth 135 that extend within the inner bore 60 of the body 15 through which the pipe 120 extends and forms an interference fit with the pipe when the pipe is inserted through the gripper ring 45. The teeth 135 extend in the direction the pipe 120 is inserted into the body 15 so that attempts to remove the pipe from within the body are opposed by the teeth 135 that dig into the pipe 120 during such an attempt. The teeth 135 also oppose rotation of the gripper ring 45 about the pipe 120.

Figure 5:
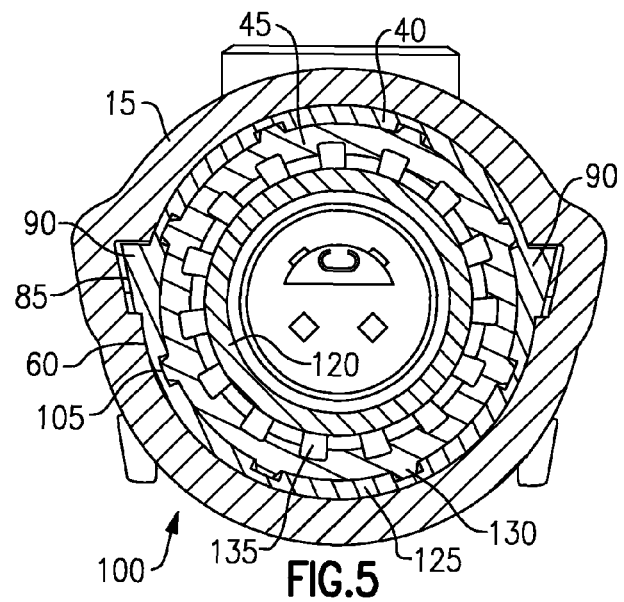
FIG. 5 is a perspective, end view of an assembled retainer, gripper ring and body of FIG. 1.

As shown in FIG. 5, the ears 90 of the backer ring 40 are inserted into the outboard openings 85 in the body 15 thereby preventing the backer ring 40 from any rotation therein. Further, the outwardly extending fingers 130 of the gripper ring 45 fit within the indentations 105 in the backer ring 40 thereby preventing the gripper ring 45 from rotating within the backer ring 40.

Referring to FIGS. 2 and 2A, after insertion of the backer ring 40 and the gripper ring 45, the collet 55 is inserted into the retainer 50. An outward extension 140 of the collet 55 gets hung up on an interior shoulder of the retainer 50. The retainer 50, similar to the backer ring 40, has a pair of ears 150 for insertion into the outboard openings 85 in the body 15 body to seal the body and prevent leakage therefrom. The retainer 50 also serves to hold the gripper ring 45 within the indentations 105 in the backer ring 40. The collet 55, the retainer 50, and the backer ring 40 in the body 15, may be constructed of a similar material, such as a plastic or polymer, that may be sonically welded together. A sonic weld provides a strong bond and helps minimize leaks through the end of the body 15. The collet 55 has an inner diameter 155 that approximates the diameter of the pipe 120 through the collet and assists in guiding the pipe into the body for positive retainment therein.

Referring now to FIGS. 2 and 6, verification cartridge 30 is shown. The verification cartridge has a first interior diameter 160, a second interior diameter 165 and a third interior diameter 170. The first interior diameter 160 is designed to hold the compression ring 35, the second interior diameter 165, is designed to hold an end of the pipe 120 to be inserted therein, and the third interior diameter 170 forms a passageway through which fluid flows to the valve portion 20. The outer surface 175 includes a first sealing element 180 that may be disposed in a groove 185 disposed outside the second interior diameter 165. A second groove 190 defines an exterior flange 195 that has a chamfered surface 200 that interacts with the chamfered surface 95 of the body 15, as will be discussed herein below. The first inner diameter 160 has a second seal 205 disposed thereon a juncture between the second inner diameter 165 and the first inner diameter 160. Interference tab 265 helps prevent insertion of verification clip 25 if the verification cartridge and compression ring are not properly in position as will be discussed herein below.

The first and second seals 180, 205 disposed in the verification cartridge 30 may be co-injection molded with the body of the verification cartridge 30. The verification cartridge is designed to have an interference fit within the body 15 so that seal 180 minimizes leakage from the valve portion 20 back towards the retainer 50. The seal 205 is not designed to have an interference fit initially with the pipe 120 that passes therethrough, as will be discussed herein. The verification cartridge has a groove 210 therein for receiving a position tab within the compression ring, as will be discussed herein.

Referring now to FIGS. 1, 2, 2A and 7, the compression ring 35 has a location tab 215 cooperating with the groove 210 of the verification cartridge. The compression ring has a chamfered surface 220 that cooperates with the verification clip 25, as will be discussed herein. The compression ring also has an interior bore 225 through which a pipe extends therethrough.

Referring now to FIGS. 1, 2, 8 and 8A, the verification clip 25 and its relationship to the body 15 of the supply stop 10 is shown. The verification clip 25 has an upper arcuate portion 230 that conforms to the shape of the exterior of the body 15 if inserted therein, a plurality of arcuate engagement members 235 for engaging the pipe 120, and two legs 240. Each leg is flexible, has an angled side 245 that is designed to engage the chamfered surface 220 of the compression ring 35 to move axially towards the verification cartridge 30 and a pair of snap tabs 250 at the ends of the legs. Each of the snap tabs 250 is designed to fit within openings 255 in the body 15. The flexibility of each of the legs 240 causes the legs to create a signal such as an audible click to be heard when the snap tabs 250 are released to extend beyond the body 15 when encountering opening 255 after being flexed inwardly to be inserted into the body 15.

Referring to FIG. 2A, to assemble the supply stop 10, the verification cartridge 30 is inserted into the body 15 before the compression ring 35. The fingers 130 of the gripper ring 45 are then inserted into the indentations 105 of the backer ring 40 so that the gripper ring does not rotate within the backer ring. The ears 90 of the backer ring 40 are inserted into the outboard openings 85 of the body 15 so that the backer ring and the gripper ring inserted in the backer ring do not rotate within the body. The collet is inserted into the retainer. Then the collet and retainer are inserted into the body 15. The collet 55, the retainer 50, the gripper ring 45, the backer ring 40 are all then sonically welded (or glued or the like) together and to the body 15. The verification cartridge 30 and the compression ring 35 are still free to move axially within the body 15. Note that exterior flange 195 is unbent and does not contact the chamfered surface 95 of the body 15. Note also that verification clip 25 is blocked from insertion into opening 80 by interference tab 265 on the verification cartridge 30 and by compression ring 35. The angled surface 245 of the legs 240 of the verification clip 25 do not reach the chamfered surface 220 of the compression ring 35 to move the compression ring towards the valve portion 20.

Referring now to FIG. 2, a pipe 120 is inserted into the body 15 through the collet 55, the compression ring 35 and the verification cartridge 30. While being inserted, an end 260 of the pipe 120 enters the second portion 165 of a reduced diameter within the verification cartridge and pushes the verification cartridge towards the valve portion 20 such that the exterior flange 195 of the verification cartridge 35 engages the chamfered surface 95 of the body 15 and bends backwardly towards the compression ring 35. The compression ring 35 is disposed at this time within the verification cartridge 30.

Because the interference tab 265 and the compression ring 35 are moved axially by insertion of the pipe 120, a user may then insert the verification clip 25 within the opening 80 within the body 15. The angled surfaces 245 of the legs 240 then have access to and engage the chamfered surface 220 of the compression ring 35, the surfaces cooperating thereby to drive the compression ring axially towards the valve portion 20. As the compression rings moves, the inner seal 205 of the verification cartridge is compressed by contact with the compression ring and the inner seal then makes contact with the pipe 120 providing sealing thereby. As the verification clip continues to move, its legs 240 extend beyond the body 15 through opening 255 and an audible click may be heard signaling to a user that installation is complete.

If the verification clip 25 is not fully inserted, the compression ring 35 will not compress the inner seal 205 properly and leakage will be detected if the water is turned on. Furthermore, if the compression ring 35 does not move far enough axially, because the pipe 120 is not inserted far enough, the legs 240 of the verification clip 25 will not move far enough in cooperation with the chamfered surface 220 of the compression ring 35 to provide an audible click.

The exterior flange 195 of the verification cartridge 30 provides two functions. First, if the pipe 120 is not inserted far enough into the body 15 (or not at all), the exterior flange 195 is flexible enough so that it pushes the verification cartridge 30, and the compression ring 35, back towards the backer ring 40 thereby minimizing a probability that a user can insert the verification clip 25 far enough into the body 15 to believe the pipe 120 is properly installed. Secondly, if the supply stop has to be removed, reused or adjusted, after the verification clip is removed, the flexible exterior flange interacts with the chamfered surface 95 of the body to push the verification cartridge and compression ring back towards the backer ring 40 so they can be accessed, adjusted or reused.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. An apparatus for connecting a pipe having a downstream end to a faucet body, said apparatus comprising:
   a faucet body having a bore configured to receive a downstream end of a pipe such that an upstream end of the pipe extends outwardly of said faucet body, said bore defining an axis;
   a stop disposed at an end of said bore for limiting insertion of said downstream end of said pipe within said bore;
   a seal extending around said pipe and being movable between an uncompressed shape wherein said seal is not sealed against said pipe and a compressed shape;
   an activator moveable in a radially inward direction relative to said axis to move said seal from said uncompressed shape to said compressed shape so that said seal comes into sealing contact with said pipe to minimize leakage from said pipe; and
   a cartridge disposed in said bore, said cartridge having an outer peripheral surface and an inner peripheral surface spaced radially inward and radially opposite of said outer peripheral surface and defined by at least one interior diameter, and wherein said inner peripheral surface of said cartridge directly holds said seal against an outer surface of said pipe.

2. The apparatus of claim 1 wherein said interior diameter conforms to said uncompressed shape of said seal.

3. The apparatus of claim 1 wherein said faucet body includes an external surface and an internal surface that defines said bore, said external surface including an opening into the bore that is configured to receive said activator, and wherein said activator is disposed outside of said faucet body when said seal is located within said faucet body in said uncompressed shape.

4. The apparatus of claim 3 wherein said activator is inserted into said opening and is disposed at least partially inside of said faucet body when said seal is located within said faucet body in said compressed shape.

5. The apparatus of claim 1 further comprising:
   a compressor that cooperates with said activator to compress said seal thereby causing said seal to make sealing contact with said pipe.

6. The apparatus of claim 5 wherein said compressor is a cylinder disposed in said bore upstream of said seal and said stop, said cylinder having an upstream end and a downstream end, said downstream end for compressing said seal when cooperating with said activator.

7. The apparatus of claim 5 wherein said compressor has a first cam surface on said upstream end.

8. The apparatus of claim 7 wherein said activator has a second cam surface that cooperates with said first cam surface when said activator is inserted in said faucet body.

9. The apparatus of claim 1 wherein said activator provides an audible click when fully inserted into said faucet body.

10. The apparatus of claim 1 wherein said faucet body has an external surface and an internal surface that defines said bore, said external surface including an exterior opening into the bore and through which said activator extends, and wherein said bore surrounds a valve downstream of said stop.

11. The apparatus of claim 10 further comprising a compressor for moving axially along said pipe to compress said seal, said compressor being forced in an axial direction along said axis into contact with said seal in response to said activator moving in a radial direction transverse to said axis.

12. The apparatus of claim 11 wherein said activator has a first cam surface and said compressor has a second cam surface, said first and second cam surfaces contacting each other to move said compressor axially.

13. The apparatus of claim 1 wherein said cartridge includes an additional seal engaging the outer peripheral surface of the cartridge.

14. The apparatus of claim 1 including a compression ring that is moveable in an axial direction relative to said cartridge by said activator such that said activator forces an end face of said compression ring into abutment against an end face of said seal.

15. The apparatus of claim 14 wherein said at least one interior diameter comprises at least a first interior diameter and a second interior diameter less than said first interior diameter, and wherein said seal engages said inner peripheral surface at said first interior diameter.

16. The apparatus of claim 15 wherein said seal is compressed between said end face of said compression ring and a shoulder of said cartridge formed between said first interior diameter and said second interior diameter.

17. The apparatus of claim 1 wherein said downstream end of said pipe directly abuts against a shoulder formed in said inner peripheral surface of said cartridge and wherein said cartridge abuts against said stop when said activator is fully inserted into said faucet body.

18. The apparatus of claim 1 wherein said faucet body includes an external surface and an internal surface that defines said bore, said external surface including an opening into the bore that is configured to receive said activator, and wherein said bore comprises an inlet bore through which said cartridge is inserted, an outlet bore through which fluid is discharged, and a minor bore located upstream of the inlet bore and downstream of the outlet bore, wherein a valve is positioned within said minor bore.

19. The apparatus of claim 18 wherein said inlet bore is coaxial with said axis and said outlet bore is non-coaxial with said axis.

20. The apparatus of claim 18 including a backer ring downstream of said cartridge and said activator, wherein said faucet body includes at least a pair of outboard openings extending from said internal surface that receive outwardly extending ears of said backer ring.

21. The apparatus of claim 20 wherein said backer ring is fixed to said faucet body while said cartridge is free to move axially within said bore.

* * * * *